Nov. 15, 1938.                G. E. MILLER                2,136,454
                    REVERSE DRIVE CONTROL MECHANISM
                       Filed Aug. 7, 1937        3 Sheets-Sheet 1

Inventor
George E. Miller

Nov. 15, 1938.　　　G. E. MILLER　　　2,136,454
REVERSE DRIVE CONTROL MECHANISM
Filed Aug. 7, 1937　　　3 Sheets-Sheet 2

Inventor
George E. Miller
By
Owen & Owen
Attorneys.

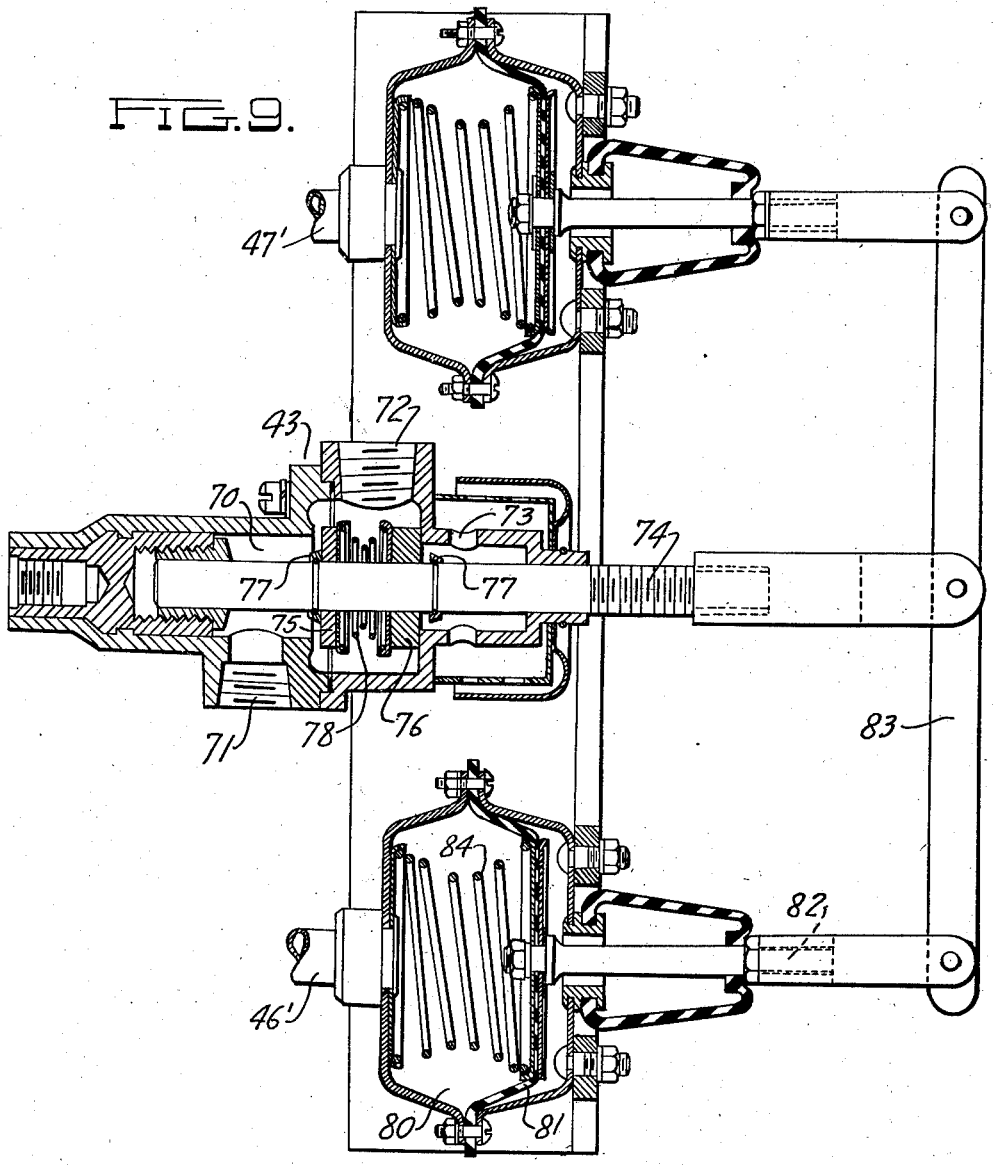

Patented Nov. 15, 1938

2,136,454

UNITED STATES PATENT OFFICE 2,136,454

REVERSE DRIVE CONTROL MECHANISM

George E. Miller, Findlay, Ohio, assignor to The Buckeye Traction Ditcher Company, Findlay, Ohio, a corporation of Ohio Application August 7, 1937, Serial No. 157,940

9 Claims. (Cl. 192—4)

This invention relates primarily to mechanism for controlling the swinging movements of turntables, crane cabs or the like, wherein the driving means is provided with separate clutches selectively engageable to effect a turning of the table in one direction or the other.

The primary object of the invention is the provision in combination with a driving means and a holding means, of simple and efficient control means therefor operable to normally apply the holding means to prevent operation of the connected device and which is automatically released when the driving means is engaged to the driven device.

Other objects and advantages of the invention will be understood from the following detailed description thereof and from the accompanying drawings, illustrating one embodiment of the invention, in which—

Figure 1:
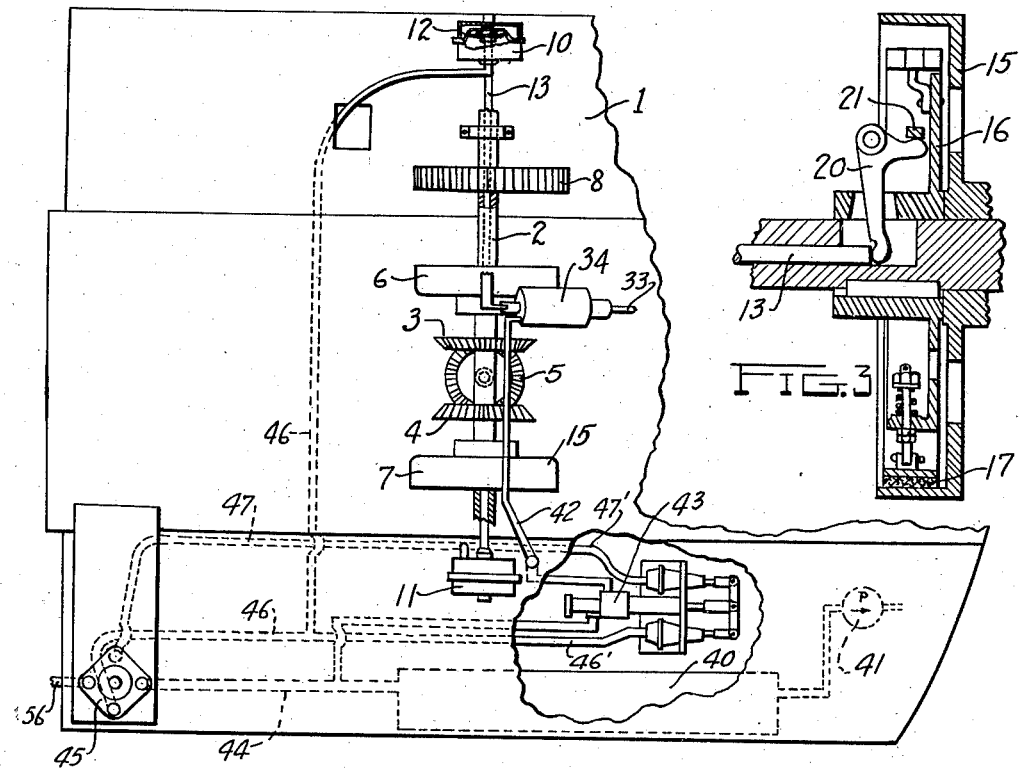
Figure 2:
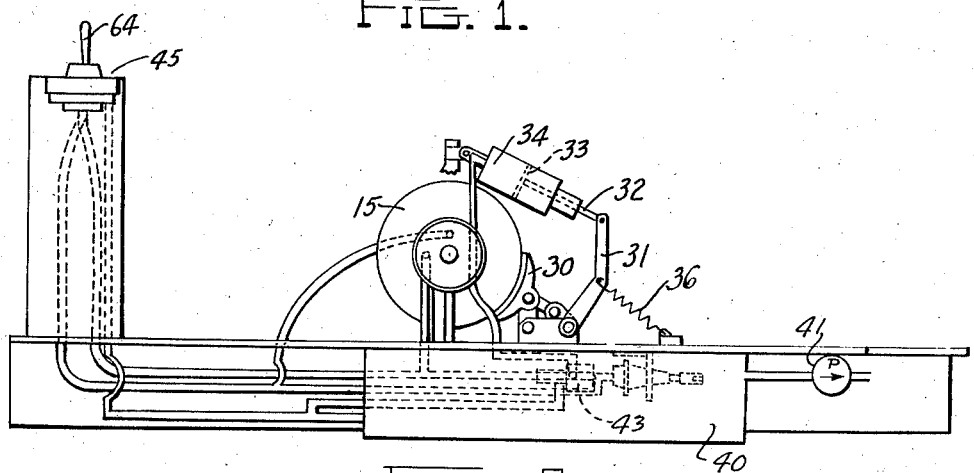
Figure 4:
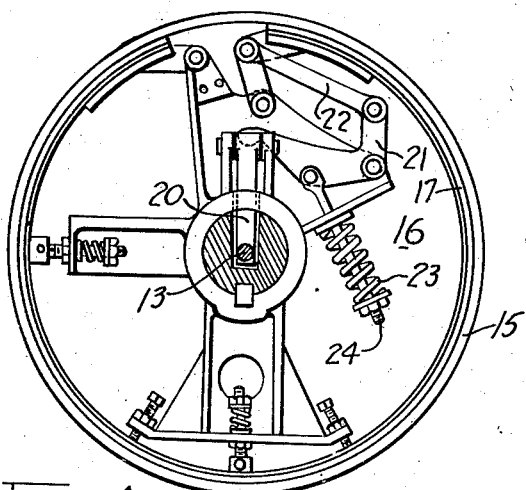
Figure 5:
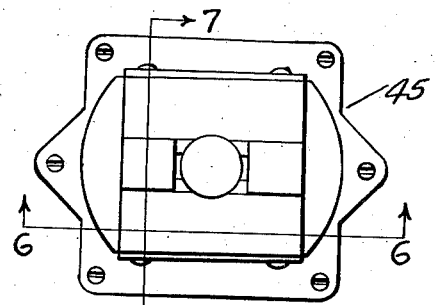
Figure 6:
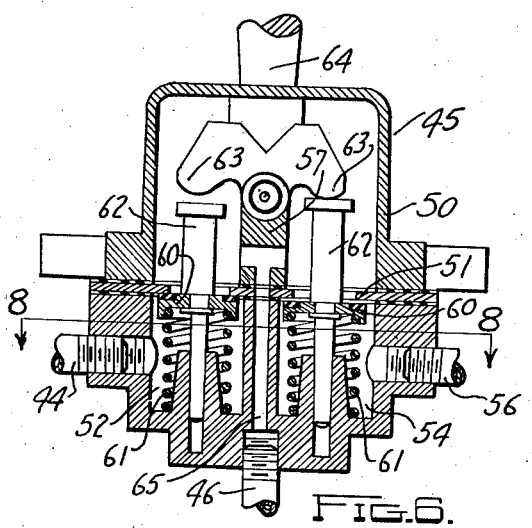
Figure 7:
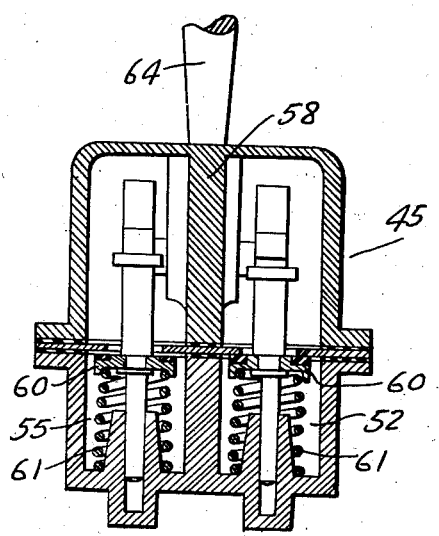
Figure 8:
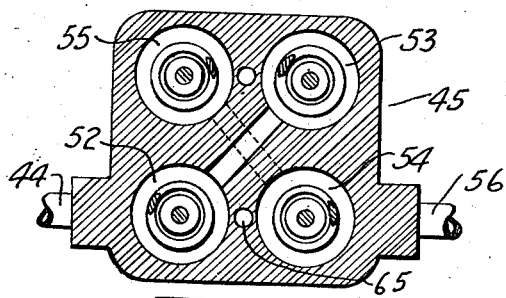

Figure 1 is a more or less diagrammatical plan view, with parts broken away, of a swingingly mounted platform and of the drive and control means therefor embodying the invention; Fig. 2 is a side elevation thereof; Fig. 3 is a sectional detail of a clutch used in connection with the invention; Fig. 4 is a side view of the clutch; Fig. 5 is a plan view of a manual control for the differential fluid pressure means used in connection with the invention; Figs. 6 and 7 are sectional views, respectively, on the lines 6—6 and 7—7 in Fig. 5; Fig. 8 is a cross-sectional view on the line 8—8 in Fig. 6, and Fig. 9 is a sectional detail of the valve and fluid pressure actuated diaphragm means employed to control the brake operation.

Referring to the drawings, 1 designates a platform mounted for swinging movements and which may constitute the mount for a swinging crane.

The reversible drive for the platform, in the present instance, comprises a shaft 2 mounted thereon and carrying opposed bevel gears 3 and 4 in mesh with a common driven pinion 5 and each having driven connection with the shaft through respective clutches 6 and 7. The shaft may be connected to any suitable power source through a driving connection including a gear 8. The bevel pinion 5 has suitable driving connection with the platform, as well understood in the art.

Each clutch 6, 7, is controlled by differential fluid pressure acting on the diaphragms in respective chambers 10 and 11, the diaphragm in each chamber being vacuum actuated to engage the clutch and being movable to permit a release of the clutch when the vacuum action thereon is absent. Each clutch operating diaphragm, one of which is shown in the chamber 10 and designated 12, is connected to a clutch operating push rod 13, which extends axially into the respective end of the shaft 2 to the associated clutch.

The clutch used in the present instance, a brief description of which may be necessary to understand the operation of the control means, is shown in detail in Figs. 3 and 4. This clutch comprises a loose driven drum member 15, a fixed drive member 16, an internal clutch band 17 for engagement with the drum and carried by the member 16, and an operating connection between the control rod 13 and the clutch band 17. This connection includes a bell crank lever 20 fulcrumed to the fixed member 16 and having one arm extending transversely into the shaft in position to be engaged by an end of the rod 13 and rocked by an actuating movement of the rod. The other arm of the lever 20 engages one arm of a bell crank lever 21, which is fulcrumed to the member 16 at right angles to the lever 20, and has its other arm connected to the clutch band by a link 22. The clutch band is connected at one end to the member 16, while its other end is free to permit expansion of the band, except that it is connected to the lever 21. This lever is normally held in clutch band releasing position by a spring 23 acting on a rod 24 attached to the lever.

It is apparent that when the push rod 13 is moved by vacuum action within the associated chamber 10, the lever 20 is moved in a direction to move the lever 21 against the action of the spring 23 and effect engagement of the clutch band 17 with the drum 15, and that when the diaphragm is relieved of the vacuum action, the clutch parts, rod 13 and diaphragm 12, will be returned to their normal released positions by the action of the spring 23. It will be understood that each clutch member 15 is fixedly connected to the adjacent bevel gear 3 or 4, so that the driving of the clutch drives the gear.

The brake means employed for holding the platform against turning when both clutches are released comprises, in the present instance, a brake shoe 30 acting against the periphery of one of the clutch members 15 (that of clutch 6 in the present instance) and such shoe is connected to and actuated by movements of a lever 31. This lever has its long arm connected by a rod 32 to a piston 33 operating in a cylinder 34. The cylinder at its outer end with respect to the lever 31 is connected to a vacuum source so that vacuum action on the piston 33 moves the lever to apply the brake. A spring 36 acts to release the brake when vacuum action is absent.

The vacuum source includes a tank 40, wherein vacuum is maintained by a pump 41, and this tank is normally in open communication with the brake cylinder 34 through a tube 42 in which a normally open control valve 43 is disposed. The tank 40 is in normally closed communication, through a tube 44 to a manual control means 45 and through branch tubes 46 and 47, with the suction side of the respective diaphragm chambers 10 and 11, through the medium of which the clutches 6 and 7 are respectively engaged.

The control 45 in itself is old, being purchased on the market, and is shown (Figs. 5 to 8) and described only sufficiently to enable its operation in connection with the present invention to be understood. This control includes a casing 50 having upper and lower sections divided by a partition member 51. The lower compartment is provided with four vertically disposed bores 52, 53, 54 and 55 forming valve chambers which are rectangularly arranged with the chambers 52 and 53 diagonally disposed and each in communication with the vacuum tube 44 from the tank 40 and with the chambers 54 and 55 likewise diagonally disposed and in communication with an air inlet tube 56. The partition member 51 has an opening therethrough from the top of each of the said valve chambers 52, 53, 54, 55 into a respective chamber in the upper section of the control, the interior of said section for such purpose being centrally divided one way by a vertical partition 57 and centrally the other way by a vertical partition 58. A separate valve 60 is disposed in each of said valve chambers and is normally held seated against the partition 51 to close the respective opening therein by an associated spring 61.

A stem 62 projects upward from each valve 60 within the associated compartment of the upper section in position to be acted on by respective fingers 63 of a hand control lever 64. This lever is fulcrumed in the partition 57 crosswise of the partition 58. The lever 64 has four fingers 63, two at one side of the fulcrum and two at the other side, and positioned to act on the upper ends of the respective valve stems 62.

Each of the branch vacuum tubes 46, 47 is connected to a respective pair of air and vacuum chambers, for instance, the tube 46 connects with the chambers 52 and 54, through a passage 65, which extends up through the casing into the partition 57 and thence opens crosswise of such partition into each of the upper compartments with which the chambers 52 and 54 are adapted to communicate when their respective valves are open.

When the control lever 64 is in its neutral position, as shown in Fig. 6, both air valves, which are disposed in the respective chambers 54 and 55, are held slightly open so that air under atmospheric pressure will be admitted, through the line 56 and communicating air chambers 54 and 55, to both branch vacuum tubes 46 and 47 to relieve any vacuum action therein. When the lever is rocked in either direction from neutral, one or the other of the branch lines 46, 47, is closed to the atmosphere by reason of the closing of the associated air valve and is opened to the vacuum tank by reason of the opening of the associated vacuum valve 60.

Such movement of the lever also further opens the air valve on the same side of the lever as the vacuum valve, which is being opened, but this is immaterial as the other branch line with which such air valve is associated should be in communication with the atmosphere. It is thus apparent that when the control lever 64 is in neutral position, both diaphragm chambers 10, 11, are closed to the vacuum tank and open to the atmosphere, and that a rocking of the lever in either direction will open the vacuum line to one or the other of the diaphragm chambers and close the air communication therewith, and thus effect an application of the associated clutch.

The automatic control valve 43 in the vacuum line to the brake cylinder is shown in detail in Fig. 9, and comprises a casing forming a central chamber 70 with longitudinally offset ports 71 and 72 for connection with the vacuum line 42, such chamber also having communication at one end with the atmosphere through ports 73. A valve stem 74 is mounted for reciprocatory movements lengthwise within the chamber 70 and carries two valves 75 and 76 which are slidingly mounted on the stem and normally held apart in engagement with respective stops 77 on the stem by an interposed expansion spring 78. The valves 75 and 76 are respectively adapted and normally urged to seat within the casing to close communication respectively between the ports 71 and 73 with the vacuum port 72, which is located on the side of the valve with the brake cylinder. The stem 74, when in its normal position, effected as hereinafter described, stands as shown in Fig. 9, with the air valve 76 seated and the vacuum valve 75 open, so that the vacuum side of the brake cylinder 34 is in communication with the vacuum source. When the stem 74 is moved inward, the vacuum valve 75 first moves to close the communication between the vacuum ports 71 and 72, and then continues its movement sufficiently for a right hand stop 77 to engage the air valve 76 and move it to open position to permit admission of atmospheric pressure to the brake cylinder, thus relieving the vacuum action therein and permitting release of the brake.

The movement of the valve stem 74 to close the vacuum line and open the air line to the brake cylinder is dependent on the opening of either clutch operating vacuum line 46, 47, to the vacuum source. To effect such dependent action, each vacuum branch 46, 47, has communication through a respective branch 46', 47', with an associated diaphragm chamber 80, the diaphragm 81 of which is in connection through a rod 82 with the respective end of a cross-bar 83 pivoted on the valve rod 74. A spring 84 in each diaphragm chamber 80 acts on the diaphragm therein to normally retain it and the connected rod 82 in its forward position, as shown, with the valve stem 74 held outwardly in open vacuum line position. When either line 46, 47, is open to the vacuum source through the control 45, the diaphragm 81 in connection with such line is subjected to vacuum action and thus caused to move inwardly against the tension of the spring 84 and to effect a rocking of the cross-bar 83 about its pivotal connection with the other rod 82, and thus move the valve stem 74 inwardly a sufficient distance to close the vacuum valve 75 and open the air valve 76 to relieve the brake holding pressure in the brake cylinder 34. When the vacuum line to both clutch operating chambers 10, 11, is closed, the vacuum is released from each supplemental chamber 80, thus permitting the cross-bar 83 to assume its normal position under the action of the released springs 84 and to return the valve rod 74 to position to close the air and open the vacuum line to the brake cylinder.

The operation of the control embodying the invention briefly is as follows.

The clutches being disengaged, the brake 30 is applied to lock the platform 1 against turning, this being effected due to the normally open vacuum line to the brake cylinder 34 through the valve 43. At the same time, both clutches 6 and 7 in released position. If it is desired to turn the platform in a direction effected by the application of the clutch 6, the operator throws the control lever 64 in a direction to the left, as shown in Fig. 6, thereby effecting an opening of the valve in the vacuum chamber 52 and a closing of the associated air valve in the air chamber 54. The line 46 to the diaphragm chamber 10 is thus closed to the atmosphere and open to the vacuum source, thus effecting an engaging operation of the clutch 6. At the same time, the supplemental diaphragm chamber 80 is also open to the vacuum source through the pipes 46, 46', thereby effecting an inward movement of the connected end of the cross-bar 83 and a corresponding movement of the valve rod 74 to first close the vacuum valve 75 in the normally open vacuum line 42 to the brake cylinder 34 and then open the air valve 76 to such chamber. It is thus apparent that the release of the brake and the application of the clutch to turn the platform 1 in the desired direction take place at approximately the same time. If the other clutch 7 is to be applied, the control handle 64 is rocked in the opposite direction or to the right, as shown in Fig. 6, thereby releasing the normal opening pressure on the air valve in the chamber 55 to permit its closing and effecting an opening of the vacuum valve in the chamber 53 of the control 45. This control action closes the branch line 47 to the air and opens it to the vacuum tank, whereby the diaphragm in the chamber 11 is actuated to apply clutch 7. At the same time the spring side of the supplemental diaphragm chamber 80 in communication with the vacuum line 47, 47', is open to the vacuum source, thereby actuating the diaphragm and communicating movement to the valve rod 74 to close the brake cylinder communication with the vacuum tank and open it to the atmosphere to permit a release of the brake.

It is apparent that while the present control is applied to the reversible driving means for a crane cab platform or other swinging member where two clutches are employed to effect movement in one or the other direction, it may be used in other connections.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In combination, a driven member capable of movements in opposite directions, means including a clutch for driving said member in one direction, a brake for preventing member driving action of said means, controlled differential fluid pressure means operable to apply said clutch, differential fluid pressure means normally acting to apply said brake, and fluid pressure controlled means automatically operable to render said brake applying means inoperative when the clutch applying means is rendered operative.

2. In combination, a driven member capable of movements in opposite directions, means including a clutch for driving said member in one direction, differential fluid pressure means operable to control the application and release of said clutch, releasable means normally acting to resist a movement of the member in either direction, and differential fluid pressure means automatically operable to release said releasable means when said first fluid pressure means is operated to apply the clutch and including a fluid pressure line, a valve normally closing said line, and valve opening means controlled by said first fluid pressure means.

3. In combination, a driven member capable of movements in opposite directions, means for driving said member including a clutch and a brake, and differential fluid pressure means including a manual control valve and an automatic valve, said last means acting to normally retain said brake applied and operable upon predetermined movement of said control valve to effect engagement of the clutch and to actuate said automatic valve to release the brake.

4. In combination, a member capable of movements in opposite directions, means for driving said member including a clutch and a brake, separate differential fluid pressure actuated means for applying said clutch and brake, means forming connections between a differential fluid pressure source and both said separate means, a normally open supplemental valve in said brake communication, a manual control means operable to open said clutch communication to said source to effect engagement of the clutch, and means in connection with said supplemental valve and automatically operable by differential fluid pressure when said clutch communication is open to effect closing of said brake communication.

5. In combination, a driven member capable of movements in opposite directions, means including a clutch for driving said member in one direction, a brake for preventing movement of the member, separate means actuated by differential fluid pressure to apply said clutch and brake, a vacuum source, means forming communication between said source and each of said separate means and having a branch portion, a normally open valve in said brake communication, a manual control normally closing said clutch communication and operable to open the same and also the communication between said source and said branch, and means in said branch in connection with said supplemental valve and operable to move the valve to close said brake communication when said control is open.

6. In combination, a driven member capable of movements in opposite directions, drive means for said member including separate forward and reverse clutches, a brake operable to prevent movement of the member, separate differential fluid pressure actuated means associated with each clutch and with the brake to selectively apply them, a differential fluid pressure source, means providing separate communication between said source and each of said separate means, a normally open supplemental valve in said brake communication, a main valve manually operable to selectively open and close said clutch communications, and means including separate units connected to said supplemental valve and disposed in respective portions of said clutch communications and operable by differential fluid pressure to close said supplemental valve when either of said clutch communications is open.

7. In combination, a driven member capable of movements in opposite directions, means for driving said member including two reverse driving clutches, a brake operable to prevent movements of said member, separate vacuum actuated means for applying each of said clutches and said brake, a vacuum source, means forming communication between said source and each of said clutch and brake applying means and each clutch communication having a branch, a normally open valve in said brake communication, a separate vacuum actuated means in each of said branches and vacuum actuated to close said valve when either branch is open to said source, and means for closing the communication between said source and each of said clutch communications and its branch and manually operable to selectively open said communications.

8. In combination, a driven member capable of movements in opposite directions, means for driving said member in one direction and including a clutch, brake means operable to resist movement of said member, separate vacuum actuated means for applying said clutch and brake, a vacuum source, means providing separate communication between said source and each of said applying means, a normally open valve in said brake communication, means operable by vacuum action in said clutch communication to actuate said valve to close the brake communication, and main control means for closing said clutch communication and operable to open the same.

9. In combination, a driven member capable of movements in opposite directions, mechanism for driving said member in opposite directions including a plurality of clutches, a brake for said mechanism operable to hold the member in any driven position, a vacuum source, separate vacuum actuated means for each clutch and for the brake to apply the same, said clutches and brake standing released when not being applied by the vacuum means, means forming separate communication between said source and each of said clutches and said brake applying means, the brake communication being normally open, means automatically operable to close said brake communication when the vacuum action is present in any of said clutch communications, and means closing each of said clutch communications and manually operable to selectively open the same.

GEORGE E. MILLER.